US009215553B2

(12) United States Patent
Rowles

(10) Patent No.: US 9,215,553 B2
(45) Date of Patent: Dec. 15, 2015

(54) AUTOMATIC DETERMINATION OF AND REACTION TO MOBILE USER ROUTINE BEHAVIOR BASED ON GEOGRAPHICAL AND REPETITIVE PATTERN ANALYSIS

(75) Inventor: Noah Tilman Rowles, Pasadena, CA (US)

(73) Assignee: Rowles Holdings, LLC, Pasadena, CA (US)

( * ) Notice: Subject to any disclaimer, the term of this patent is extended or adjusted under 35 U.S.C. 154(b) by 143 days.

(21) Appl. No.: 13/470,160

(22) Filed: May 11, 2012

(65) Prior Publication Data
US 2013/0303194 A1 Nov. 14, 2013

(51) Int. Cl.
H04W 4/02 (2009.01)
H04W 4/00 (2009.01)

(52) U.S. Cl.
CPC ............... H04W 4/02 (2013.01); H04W 4/001 (2013.01)

(58) Field of Classification Search
CPC ....... H04W 64/00; H04W 4/02; H04W 4/025; H04W 4/04; H04W 4/028; H04W 56/006; H04W 4/001
USPC .......... 455/404.2, 414.1, 456.1, 456.3, 456.6, 455/457
See application file for complete search history.

(56) References Cited

U.S. PATENT DOCUMENTS

| 7,742,760 | B2 | 6/2010 | Patzer et al. |
| 8,565,779 | B2 | 10/2013 | Wu |
| 8,688,144 | B1 | 4/2014 | Alexander |
| 2002/0123373 | A1 | 9/2002 | Kirbas et al. |
| 2002/0160817 | A1* | 10/2002 | Salmimaa et al. ............ 455/566 |
| 2004/0024621 | A1* | 2/2004 | Read .................................. 705/6 |
| 2006/0223495 | A1 | 10/2006 | Cassett et al. |
| 2008/0170543 | A1* | 7/2008 | Rossetti et al. ............... 370/329 |
| 2010/0041391 | A1 | 2/2010 | Spivey et al. |
| 2010/0317371 | A1 | 12/2010 | Westerinen et al. |
| 2012/0084248 | A1* | 4/2012 | Gavrilescu ...................... 706/52 |
| 2012/0100869 | A1 | 4/2012 | Liang et al. |
| 2012/0143694 | A1* | 6/2012 | Zargahi et al. ............ 705/14.66 |

OTHER PUBLICATIONS

Kang et al. Personalized Battery Lifetime Prediction for Mobile Devices based on Usage Patterns Published: Journal of Computing Science and Engineering, vol. 5, No. 4, Dec. 2011, pp. 338-345.
Vallina-Rodriguez et al. Energy Management Techniques in Modern Mobile Handsets Published: Communications Surveys & Tutorials, IEEE (vol. 15, Issue 1), pp. 179-198, Feb. 24, 2012.
Carroll et al. An Analysis of Power Consumption in a Smartphone. Proceedings of the 2010 USENIX conference on USENIX, annual technical conference (2010), pp. 271-284.
Kang et al. Usage Pattern Analysis of Smartphones Published: Network Operations and Management Symposium (APNOMS), 2011 13th Asia-Pacific, Sep. 21-23, 2011, pp. 1-8.

* cited by examiner

Primary Examiner — Dinh P Nguyen
(74) Attorney, Agent, or Firm — Van Pelt, Yi & James LLP

(57) ABSTRACT

A pattern associated with a mobile device is determined based at least in part on time information and location information associated with the mobile device. A mobile device behavior to be associated with the pattern is determined. The mobile device is configured to exhibit the mobile device behavior automatically during at least a portion of a subsequent repetition of the pattern.

21 Claims, 8 Drawing Sheets

|  | Time spent at pattern | Community acceptance rate | Expert opinion | Power savings |
|---|---|---|---|---|
| Mobile device behavior for school stationary pattern | 4 out of 5 | 3 out of 5 | 4 out of 5 | 5 out of 5 |
| Mobile device behavior for home stationary pattern | 5 out of 5 | 2 out of 5 | 3 out of 5 | 3 out of 5 |

FIG. 7

AUTOMATIC DETERMINATION OF AND REACTION TO MOBILE USER ROUTINE BEHAVIOR BASED ON GEOGRAPHICAL AND REPETITIVE PATTERN ANALYSIS

BACKGROUND OF THE INVENTION

Mobile devices (such as mobile telephones, laptops and tablets) are becoming increasingly common in people's lives, both in the number of people who use a mobile device and in the amount of time people are spending on their mobile devices. As the usage of mobile devices increases, the performance of mobile devices and their interactions with people increasingly have an impact on users. New techniques for managing mobile devices, for example so that a user has a better experience and/or the performance of the mobile device (e.g., battery life) is improved, would be desirable.

BRIEF DESCRIPTION OF THE DRAWINGS

Various embodiments of the invention are disclosed in the following detailed description and the accompanying drawings.

FIG. 7 is a diagram showing an embodiment of a table for prioritizing mobile device behaviors.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
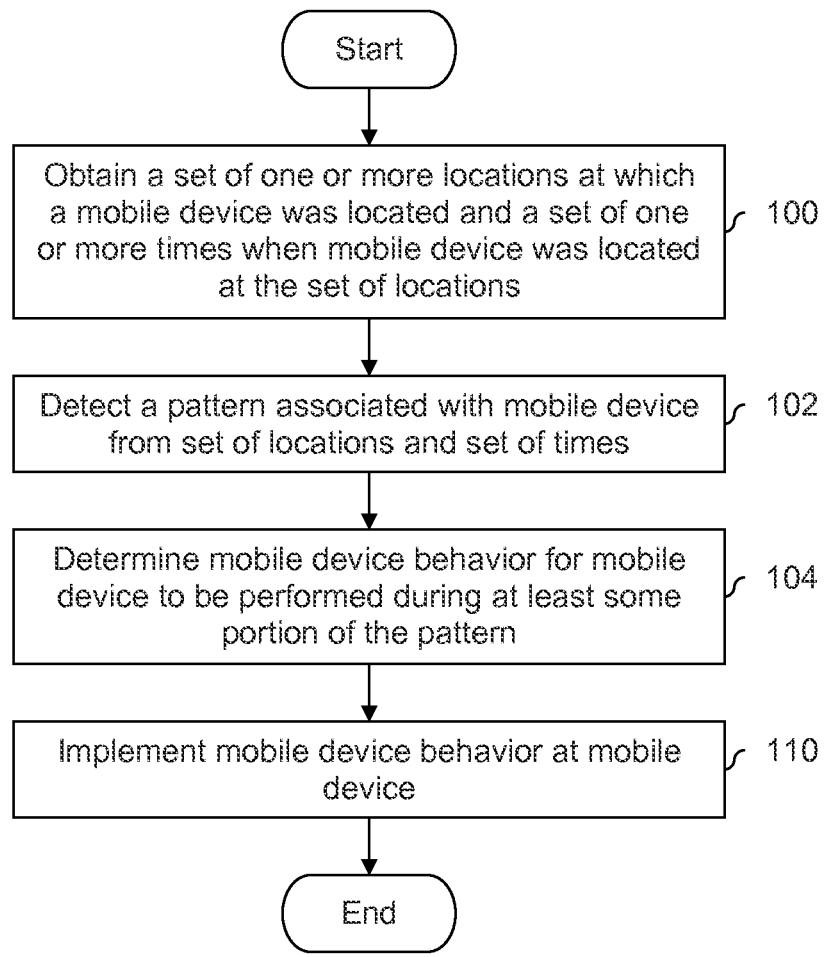
FIG. 1A is a flowchart illustrating an embodiment of a process for determining a pattern for a mobile device and implementing a mobile device behavior.

FIG. 1A is a flowchart illustrating an embodiment of a process for determining a pattern for a mobile device and implementing a mobile device behavior. A mobile device may include (but is not limited to) a mobile telephone (such as a smart phone with an operating system), a tablet computer, an e-reader, or a laptop. At 100, a set of one or more locations at which a mobile device was located and a set of one or more times when the mobile device was located at the set of locations are obtained. For example, the mobile device may have Global Positioning System (GPS) capabilities and positions and times from the GPS are recorded.

At 102, a pattern associated with a mobile device is detected from a set of locations and a set of times. As used herein, a pattern is a pattern displayed by the mobile device which is defined by or otherwise associated with times and/or locations. In various embodiments, a pattern can encompass and/or be defined by a variety of descriptors or parameters. A pattern may be a stationary pattern, such as a stationary position or location at which the mobile device tends to remain at regular days of the week and/or at regular times throughout the day. In some embodiments, a stationary pattern is defined by coordinates, whereas in other embodiments, a stationary pattern is defined by descriptors or place names (e.g., school, Starbucks, home, Westwood, etc.). A stationary pattern may be detected, for example, by observing that the device has been at locations within a prescribed distance of each other (e.g., within a prescribed radius of some point) at regularly observed times of day, days of the week, etc. A pattern may be a round-trip pattern, for example with two ends and a path or route between the two. As with stationary patterns, in some embodiments, descriptors or place names may be used to describe one or both of the ends and/or a path or route between the two (e.g., work as a descriptor for one end, school as a descriptor for the other end, and commute between work and school to describe the route between the two or Highway 101 to describe the route between the two, etc.).

Determination of a pattern may be performed in a variety of ways. In some embodiments, a server performs this step as opposed to a mobile device. For example, the information obtained at 100 may be sent from the mobile device to a server and the server determines a pattern at 102. In some embodiments, patterns are detected by parsing location and time data according to time. In some embodiments, patterns are detected by parsing location and time data beginning with locations at which the most time is spent. In some embodiments, a stationary or round-trip pattern buffer is written to, which is then "closed" when it is detected that that type of pattern is ending (e.g., a stationary pattern is transitioning to one in which movement is detected, indicating the end of the stationary pattern). In some embodiments, a clean-up and/or grooming process is performed (e.g., at the end of a pattern detection process) once a "raw" collection of patterns is detected, for example to consolidate duplicate patterns or vary the associated location and/or time data for a particular pattern (e.g., so that a subsequent process such as determination of a mobile device behavior produces better results) In some embodiments, patterns are determined by first determining round-trip patterns; once round-trip patterns are determined then stationary patterns are determined.

A mobile device behavior for a mobile device to be performed during at least some portion of the pattern is determined at 104. In some embodiments, determining a mobile device behavior is performed on a server (as opposed to a mobile device), for example the same server on which a pattern is determined at 102. A mobile device behavior as used herein is a suggestion associated with a mode, configuration, or setting associated with how the mobile device operated or is otherwise used. In some embodiments, a mobile device behavior relates to and/or affects only the related pattern. For example, if the mobile device behavior relates to a lock or password mechanism for the mobile device, the mechanism may return to some previous setting or state when the time and/or location is not that of the related pattern. In some embodiments, a mobile device behavior relates to the quality of a user's experience or interaction with a mobile device. In some cases, the mobile device behavior may be to avoid embarrassing situations. For example, if it is determined at 104 that the mobile device is routinely brought to Los Angeles Philharmonic performances, a mobile device behavior may be to turn off the ringer of a mobile telephone so that the ringer does not go off during a performance. In another example of a mobile device behavior related to improving user experience, if a round-trip pattern is determined at 104, a resulting mobile device behavior may be to turn off Wi-Fi during the round-trip pattern. A mobile device may not remain in range of any particular Wi-Fi network (since the mobile device is presumably moving in a car) and the user may find it annoying (and it may impact device performance or battery life) to be repeatedly asked by the mobile device to join different Wi-Fi networks along the route. Another related mobile device behavior may be to ensure a Wi-Fi signal (such as a beacon from an access point) is detected for a certain period of time before permitting the user to be asked to join that Wi-Fi network. This may enable differentiation between transitory Wi-Fi networks (e.g., located along the route) and persistent Wi-Fi networks (e.g., provided by a bus or train with Wi-Fi service or when tethering capabilities are available). In some other embodiments, a mobile device behavior relates to performance of the mobile device, for example related to power consumption, processing or memory capacity, and/or bandwidth throughput. These are some examples of mobile device behaviors; some other embodiments are described below.

At 110, the mobile device behavior is implemented at the mobile device. In some embodiments, an agent, application, or process is installed on a mobile device and this agent manages performing the mobile device behavior, such as when to enter or exit. The agent may, for example, store a setting or configuration before the associated control is changed, change the control to the mobile device behavior, and then change the control back to the stored setting or configuration at the end when the pattern ends. In various embodiments, current time (e.g., from a clock, remote server, or GPS) and/or current location (e.g., from the GPS) is/are used to determine when a pattern begins/ends and thus when the mobile device behavior is to be initiated/concluded. In some cases a wireless device's GPS may be turned off (e.g., manually by a user) and current location information is not available. To deal with this, in some embodiments detecting when a pattern starts/ends is determined by current location information (if available), otherwise a current time is used.

In some embodiments, some other sensed or detected input is used to detect when a pattern starts (or ends) and thus when to implement (or terminate) a mobile device behavior. Some examples include losing a Bluetooth or other near-field connection (e.g., when a driver of a car reaches a destination, a mobile telephone which was previously connected to the hands-free Bluetooth system of the car will end when the driver turns off the car), being coupled to an AC adapter (e.g., some people may plug in their mobile device when they return home or are at the office), entering a Wi-Fi network (e.g., some people may have their mobile devices set to automatically connect to Wi-Fi networks of places they frequently go to), and both the fact that there is a Wi-Fi connection and the name of the network (e.g., "Company Wireless," "Home Wireless," "Coffeeshop Wireless," etc.) may indicate a specific pattern (e.g., at home versus at work).

In some embodiments, the process is performed at the initiative or under the direction or control of an enterprise, device maker, carrier, government entity, or such in order to impose a desired behavior without requiring permission from a user. In some other embodiments, a user configures a device to automatically accept some or all mobile device behaviors, for example based on certain specified criteria. The following figure shows an embodiment where permission is requested first.

Figure 1B:
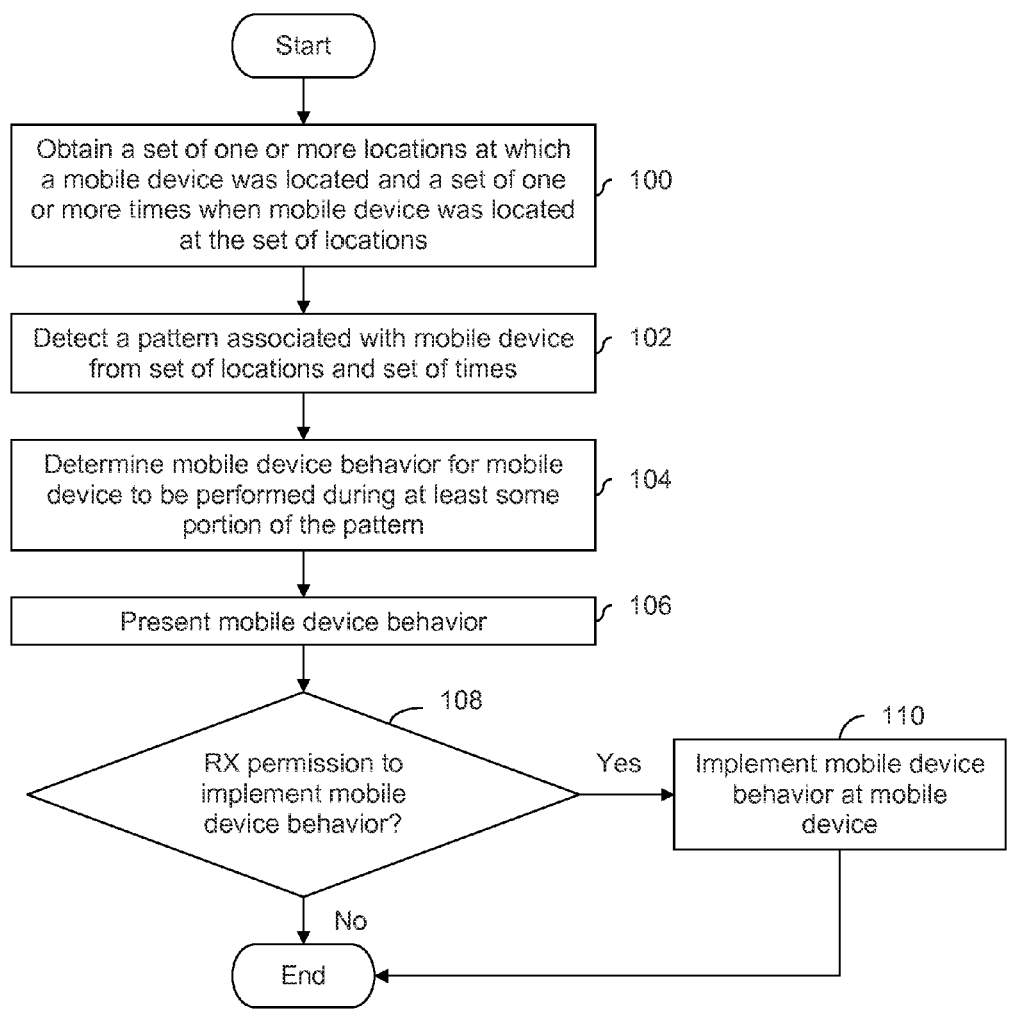
FIG. 1B is a flowchart illustrating an embodiment of a process for determining a pattern for a mobile device and implementing a mobile device behavior.

FIG. 1B is a flowchart illustrating an embodiment of a process for determining a pattern for a mobile device and implementing a mobile device behavior. In the example shown, the process is similar to that shown in FIG. 1A, but permission is requested in order for the mobile device behavior to be implemented. At 106, the mobile device behavior is presented. In some embodiments, a mobile device behavior is passed from a server to a mobile device and the mobile device behavior is presented via the mobile device. In some other embodiments, suggestions are presented and/or managed in some other manner. For example, the user may be sent an email or other type of message with a list of suggestions or a link to a website (e.g., www.iolo.com/manage my devices) at which mobile device behavior(s) may be reviewed. In some embodiments, a user may go directly to a website and view mobile device behavior(s) there. At 108, it is determined if permission to implement the mobile device behavior is received. As at 106, a variety of interfaces and techniques may be used to receive permission to implement a mobile device behavior, including via a mobile phone itself (e.g., a pop-up window with an "Accept" button and a "Decline" button) or via a website, email, text message, etc.

Figure 2:
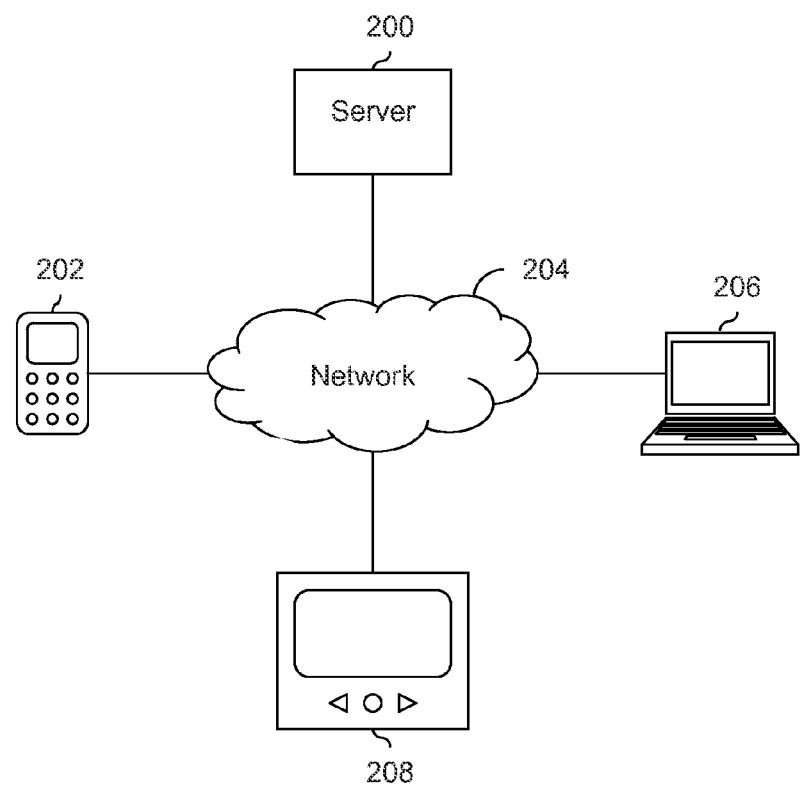
FIG. 2 is a diagram showing an embodiment of mobile devices for which patterns and mobile device behaviors are determined.

FIG. 2 is a diagram showing an embodiment of mobile devices for which patterns and mobile device behaviors are determined. In the example shown, mobile telephone 202, laptop 206, and tablet 208 are examples of mobile devices. Mobile devices 202, 206 and 208 communicate with server 200 via network 204. In some embodiments, server 200 receives location and time information from mobile devices 202, 206, and 208 and determines patterns based on the received information. Server 200 may further determine mobile device behaviors for mobile devices 202, 206, and 208. In some embodiments, mobile device behaviors are sent (e.g., via network 204) to the mobile device where they are presented and (if desired) accepted by a user. In some embodiments, server 200 includes or is coupled to a web server and a user of a mobile device accesses a webpage to review and/or accept mobile device behaviors.

In some embodiments, a mobile device behavior is applied to multiple devices, for example associated with the same user. For example, if a given user owns all of mobile telephone 202, laptop 206, and tablet 208, a user may have the ability to apply (e.g., selected) mobile device behaviors to multiple (e.g., specified) devices. In some embodiments, a user has a unique user ID and each of mobile devices 202, 206, and 208 has an agent running on it with the user ID. A user may be presented with the mobile device behavior: "Turn off device during the hours of midnight-6:00 am?" and have the option to ignore, or apply to one or more of devices 202, 206, and/or 208 (e.g., specified or selected by the user from a list of the user's devices).

In some embodiments, a system is able to remember previous state information for mobile device behaviors, for example even if a user loses a device or acquires a new device. It is not uncommon for a user to lose a mobile telephone or buy a new mobile telephone with newer features. To configure the new device to operate in the same manner as the old device, a user installs the agent on the new device, logins in with their user ID, and identifies the device as a particular one from the user's collection (e.g., "My Personal Phone" as opposed to "My Work Phone"). In response, the saved settings for that device are downloaded from server 200 and the new mobile device operates per the mobile device behaviors previously accepted using the previous device.

Figure 3:
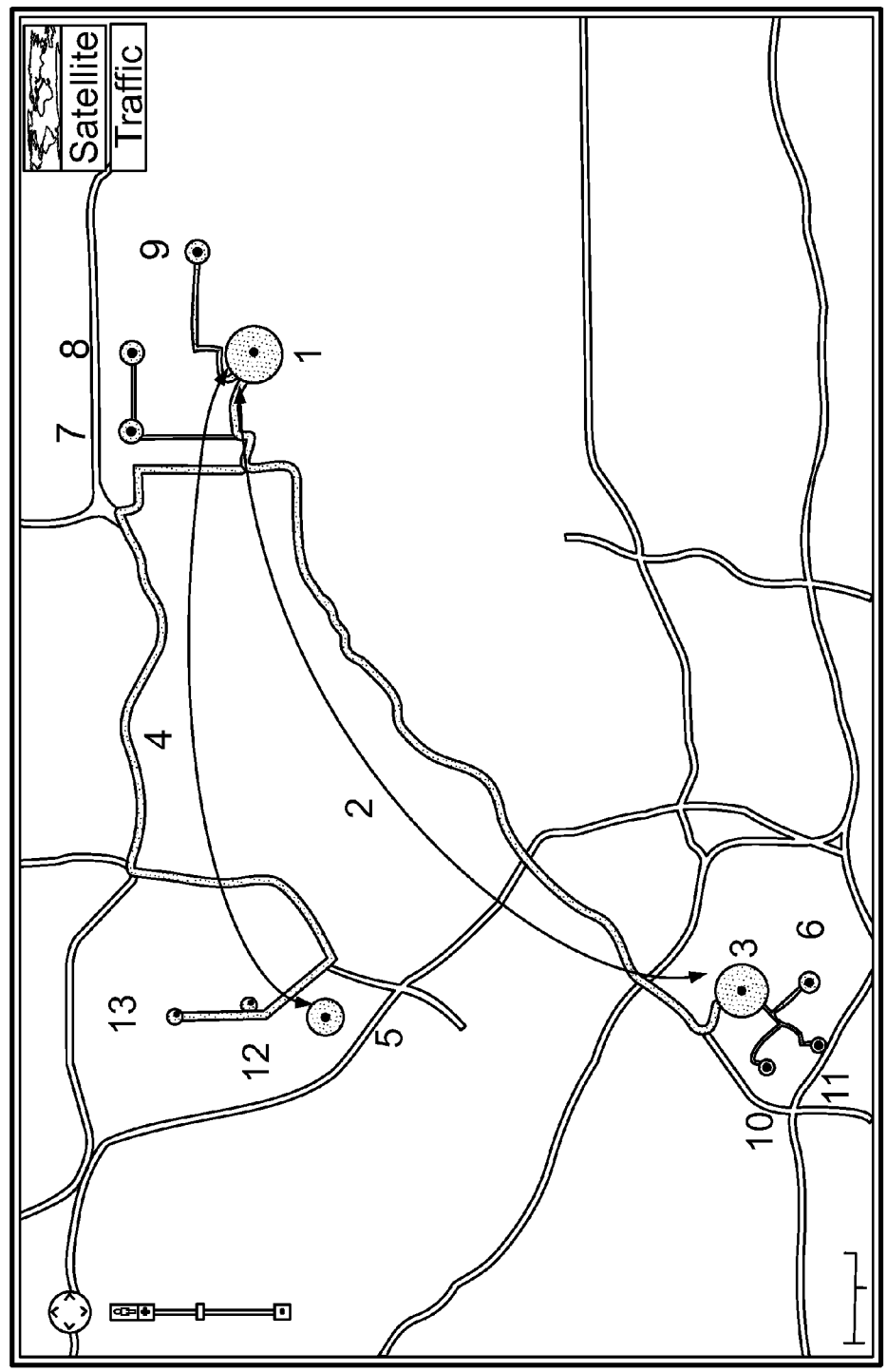
FIG. 3 is a diagram showing some embodiments of patterns.

FIG. 3 is a diagram showing some embodiments of patterns. In the example shown, a pattern may be a stationary pattern or a round-trip pattern. Stationary patterns 1, 3, and 5-13 are described in Table 1 and round-trip patterns 2 and 4 are described in Table 2.

TABLE 1

Example stationary patterns.

| Stationary pattern | Average weekly time | Average radial deviation | Most likely days | Most likely times |
|---|---|---|---|---|
| Pattern 1 | 84 hours | <100 feet | Sun-Sat | 7:00 pm-7:00 am |
| Pattern 3 | 41 hours | <75 feet | Mon-Fri | 7:45 am-5:30 pm |
| Pattern 5 | 15 hours | <50 feet | Tue, Wed, Sat-Sun | Tue-Wed: 7:15 pm-10:45 pm Sat-Sun: 8:30 am-5:30 pm |
| Pattern 6 | 4 hours | <75 feet | Mon-Fri | 11:30 am-2:00 pm |
| Pattern 7 | 4 hours | <50 feet | Fri-Sat | 6:30 pm-9:30 pm |
| Pattern 8 | 3.5 hours | <100 feet | Mon-Fri | 6:00 pm-8:30 pm |
| Pattern 9 | 2.5 hours | <75 feet | Mon-Fri | 6:15 pm-9:00 pm |
| Pattern 10 | 2 hours | <50 feet | Thu-Fri | 4:30 pm-6:30 pm |
| Pattern 11 | 2 hours | <75 feet | Tue-Fri | 11:30 am-2:00 pm |
| Pattern 12 | 1.5 hours | <50 feet | Sat-Sun | 12:30 am-2:30 pm |
| Pattern 13 | 1 hour | <100 feet | Sun | 8:30 am-10:00 am |

TABLE 2

Example round-trip patterns.

| Round-trip pattern | Average weekly time | Distance one-way | Average radial deviation | Most likely days | Most likely times |
|---|---|---|---|---|---|
| Pattern 2 | 8 hours | 12.5 miles | <100 feet | Mon-Fri | Mon-Fri: 7:00 am-7:45 am 5:30 pm-6:15 pm |
| Pattern 4 | 1.5 hours | 8 miles | <75 feet | Tue, Wed, Sat-Sun | Tue, Wed: 6:45 pm-7:30 pm Sat-Sun: 10:30 pm-11:30 pm Sat-Sun: 8:00 am-8:30 am 11:00 pm-11:45 pm |

In the example shown, line thickness is used to represent the average weekly time spent for a corresponding round-trip pattern. For example, an average of 8 hours a week is spent in round-trip pattern 2 where only 1.5 hours per week are spent on average in round-trip pattern 4. As a result, the thickness of the line for round-trip pattern 2 may be drawn thicker than that for round-trip pattern 4. Similarly, size is used to represent average weekly time spent at a particular stationary pattern. For example, the stationary pattern with the highest average weekly time is stationary pattern 1 at 84 hours and the size of the heat spot for stationary pattern 1 may be drawn to reflect this.

In some embodiments, a user is present with a pattern map (such as the one shown here) by accessing an agent running on a mobile device. In some embodiments, a user is able to access a map showing patterns by going to a website (e.g., www.iolo.com/manage_my_devices) and logging in. In some embodiments, a presented map is interactive, so that a user is able to manipulate and manage patterns or associated mobile device behaviors using an input device (e.g., a mouse, a keyboard, a touch screen, etc.). In one example, a user is able to select a pattern, trigger display of a corresponding mobile device behavior, and modify, accept and/or decline the presented mobile device behavior.

To identify or detect stationary patterns and/or round-trip patterns such as those shown in Tables 1 and 2 and FIG. 3, a variety of techniques may be used. The following figure describes on embodiment for detecting stationary patterns and round-trip patterns from raw location and time information.

Figure 4:
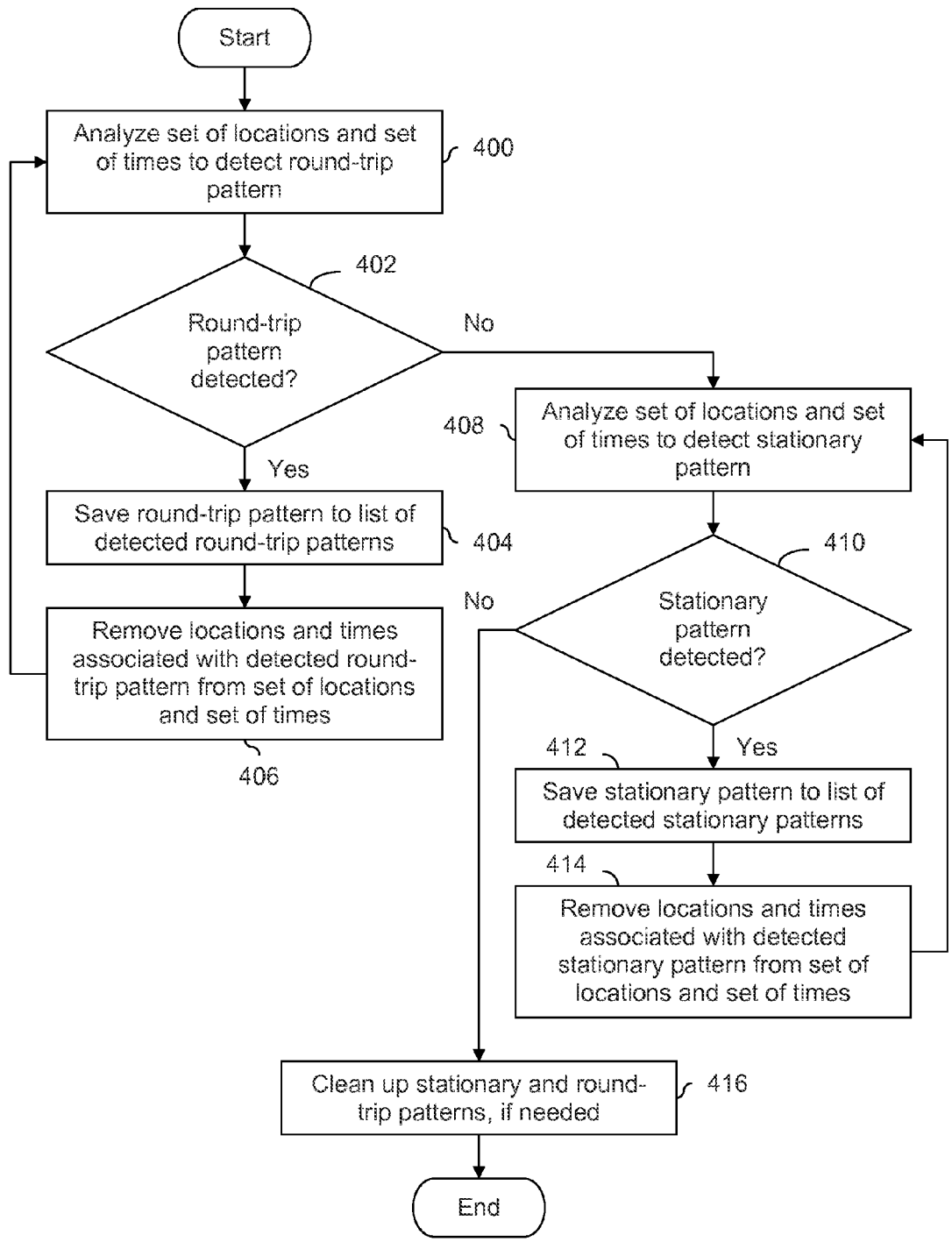
FIG. 4 is a diagram showing an embodiment of a process to detect round-trip and stationary patterns associated with a mobile device.

FIG. 4 is a diagram showing an embodiment of a process to detect round-trip and stationary patterns associated with a mobile device. In some embodiments, step 102 in FIG. 1 is implemented as described here, producing patterns such as those shown in Tables 1 and 2 and FIG. 3. In the example shown here, location and time information are analyzed to detect round-trip patterns first, then stationary patterns. In some other embodiments the sequence is reversed.

At 400, a set of locations and a set of times are analyzed to detect a round-trip pattern. In one example, locations are processed according to their corresponding times, beginning with the location that corresponds to the earliest time. The process may examine locations according to time and look for successive locations that show (e.g., significant or noteworthy) movement, discarding back-to-back locations that indicate (relatively) no movement. In this example and other examples, there may be some (e.g., radial) threshold so that relatively small changes in location (some of which may be due to noise, such as noise from the GPS system) are not determined to correspond to movement. In this example, once (significant) movement is detected, the locations and their corresponding times are added to a temporary path; once it is determined that movement has ended (e.g., the location does not change for a certain amount of time), the temporary path is concluded and the temporary path (comprising the locations and times for which there was movement) becomes a round-trip routine.

In some embodiments, location and associated time data are used to compute a velocity of travel (distance traveled between two points over the difference in the time associated with each point, for example), and information about the pattern is inferred. For example, travel at speeds associated with automobile travel, such as highway or other posted speed limits, may be used to identify a round-trip pattern as a driving commute pattern. In such a case, a "safe driving" device profile, for example one that prevents short message service (SMS) or other text-based message, keypad dialing, Internet browsing, etc., may be applied automatically when the device is detected to be at a location associated with the round-trip commute pattern at a commute-associated time or day and/or day of the week. Other profiles include a homework profile (e.g., kids can't send or receive communication during the hours of 3-5 pm on school nights) or bedtime profiles (e.g., kids can't send or receive communication during the hours of 10 pm-6 am on school nights).

At 402, it is determined if a round-trip pattern was detected. For example, if the set of location information indicates that the mobile device is stationary (e.g., it is a tablet that typically remains at home or the process has already detected all round-trip patterns), then no round-trip pattern may be detected at 402. If a pattern is detected at 402, then the round-trip pattern is saved to a list of round-trip patterns at 404. For example, the locations and corresponding times associated with a round-trip pattern may be saved to a list of detected round-trip patterns. The locations and times associated with the detected round-trip pattern are removed from the set of locations and set of times at 406. The process then analyzes the set of locations and set of times to detect a round trip pattern at 400.

If no round-trip pattern is determined to have been detected at 402, then the set of locations and the set of times are analyzed to detect a stationary pattern at 408. In this example, since the locations and times associated with round-trip patterns have already been detected and removed, the remaining locations comprise mostly stationary locations. In one example, the process examines the locations according to time, beginning at the earliest time, and looks for relatively stationary positioning in the same place. As described above, in some embodiments, there may be some threshold (e.g., radial) distance so that relatively small changes in location (e.g., due to small movements or noise) are not interpreted by the process as movement. Once the process detects a relatively stationary positioning, the process writes the location and time information to a temporary spot. The temporary spot is added to (e.g., with the time and location of each successive data point for which there is no significant or noteworthy movement) until the analysis of the set of information and set of time indicates that there is some movement. The times and locations stored in or otherwise associated with the temporary spot then become a stationary pattern.

It is determined at 410 if a stationary pattern has been detected. For example, the process may be near the end of the process and all stationary patterns may have already been detected, or the information being processed corresponds to constant movement. If a stationary pattern is determined to have been detected at 410, the stationary pattern is saved to a list of detected stationary patterns at 412. For example, the locations and corresponding times which comprise a stationary pattern may be saved to a list of detected stationary patterns. At 414, locations and times associated with the detected stationary pattern are removed from the set of locations and the set of times.

If it is determined at 410 that no stationary pattern was detected, stationary and round-trip patterns are cleaned up, if needed, at 416. For example, grooming and/or consolidation of the patterns may be performed based on certain predefined rules. For example, it may be a rule that the ends of a round-trip pattern must also correspond to a stationary pattern. The list of stationary patterns and round-trip patterns may be examined and added to (as needed), in the event there is no stationary pattern corresponding to an end point of one of the round-trip patterns. In some cases, there may be duplicate stationary or round-trip patterns, and the duplicates are merged into a single pattern (e.g., a morning commute from home to work would have the same locations—in reverse—as an evening commute from work to home, but with times in the early evening as opposed to times in the morning). These are some examples of clean up; in some other embodiments, some other clean up processes are performed.

Returning back to the example of FIG. 1, once a pattern (such as a stationary pattern or round-trip pattern) associated with a mobile device is detected at 102, a mobile device behavior is determined at 104. In some embodiments, heuristic pattern matching is performed where predefined patterns associated with certain activities or locations are defined. The tables below show some examples of predefined stationary and round-trip patterns.

TABLE 3

Example predefined stationary patterns for detecting stationary patterns

| Predefined stationary pattern | Weekly time | Most likely times |
|---|---|---|
| Home | >60 hours | Evening OR morning OR weekends |
| Workplace | >20 AND <60 hours | Daytime AND weekdays |
| School | >10 AND <40 hours | Daytime AND weekdays |
| Restaurant or bar | <3 hours | Evening |
| Café | >3 AND <5 hours | Morning OR mid-day |
| Routine Visit | >5 AND <30 hours | Evening OR weekends |
| Shopping | <5 hours | (Evening AND weekdays) OR (mid-day AND weekends) |

TABLE 4

Example predefined round-trip patterns for detecting round-trip patterns

| Predefined round-trip pattern | Weekly time | Most likely times |
|---|---|---|
| Work commute | >2 hours | (Morning OR early evening) AND weekdays |
| Routine visit commute | >1.5 hours | Early evening OR weekends |
| School commute | 1.5 hours | Daytime AND weekdays |

In some embodiments, to determine a mobile device behavior for a pattern, a pattern (e.g., such as those shown in Tables 1 and 2) is compared to one or more predefined patterns until a matching one is found. To illustrate how matching is performed in at least some embodiments, stationary pattern 1 in Table 1 is compared to the predefined stationary patterns in Table 3; of the predefined patterns there, stationary pattern 1 matches that of a home pattern (i.e., it satisfies the criteria of more than 60 hours a week and the mostly likely times are in agreement). Examination of the weekly times shows that the time spent at stationary pattern 1 (i.e., 84 hours) does not match that of the other predefined patterns. In some embodiments, predefined patterns are uniquely defined so that each pattern can match at most one predefined pattern. Once a matching predefined pattern is found, a mobile device behavior which corresponds to that particular predefined pattern may be selected. Tables 5 and 6 show some example mobile device behaviors for a mobile telephone corresponding to the predefined patterns shown in Tables 3 and 4. In the example shown, mobile data refers to a data network associated with mobile telephony, such as a 3G or 4G. In some embodiments, there are different mobile device behaviors for different mobile devices; for example, there may be different mobile device behaviors (not shown) for tablets and laptops. In some embodiments, for settings or configurations which are not described by or included in a particular mobile device behavior, control is left unchanged (i.e., it remains at the setting or configuration it was before the mobile device behavior went into effect).

TABLE 5

Example mobile device behaviors corresponding to predefined stationary patterns

| | Mobile device behavior for mobile telephone |
|---|---|
| Home | Global power: off at 1 am, on at 7 am<br>Wi-Fi: on<br>Mobile data: off<br>Bluetooth: off<br>Ringer: on |
| Workplace | Wi-Fi: on<br>Mobile data: off<br>Bluetooth: off<br>Ringer: vibrate |
| School | Global power: off |
| Restaurant or bar | Bluetooth: off<br>Mobile data: on<br>Ringer: vibrate |
| Café | Wi-Fi: on<br>Mobile data: off<br>Bluetooth: off<br>Ringer: vibrate |
| Routine visit | Wi-Fi: on<br>Mobile data: off<br>Bluetooth: off<br>Ringer: on |
| Shopping | Wi-Fi: off<br>Mobile data: on<br>Ringer: on |

TABLE 6

Example mobile device behaviors corresponding to predefined round-trip patterns

| | Mobile device behavior for mobile telephone |
|---|---|
| Work commute | Bluetooth: on<br>Wi-Fi: off<br>Text messaging: off<br>Web browser: off<br>E-mail application: off |
| Routine visit commute | Bluetooth: on<br>Wi-Fi: off<br>Text messaging: off<br>Web browser: off<br>E-mail application: off |
| School commute | Bluetooth: on<br>Wi-Fi: off<br>Text messaging: off<br>Web browser: off<br>E-mail application: off |

The controls for which configurations or settings are shown in Tables 5 and 6 are merely exemplary and are not intended to be limiting. In some other embodiments, a mobile device behavior is associated with one or more of the following: tones (e.g., a ringtone for a telephone call, a ringtone associated with a specific caller, a tone for a text message, a tone for a voicemail message, a tone for an email message being sent/received, etc.), sound effects (e.g., associated with alerts, alarms, typing on a keypad, etc.), a screen or keypad lock, a background or wallpaper, call handling (e.g., call forwarding, call waiting, displaying caller ID), notifications or reminders (e.g., pop ups associated with calendar appointments, text message notifications, notifications from social media, etc.), or a state, setting or configuration associated with an application or agent running on a device (e.g., starting up an application, putting an application into a certain state, for example by setting a control to a certain value or configuration). In some specific examples of the above, a mobile device behavior (e.g., associated with a home) includes wiping or deleting some memory such as a cache or history, for example, associated with a particular application (e.g., an Internet browser application) or a call log associated with a telephone. This may, for example, be something that is done every night at home, presumably when the user is asleep. In another example, a mobile device behavior associated with work includes turning caller ID for a telephone off, so that a call made from a personal mobile telephone during work hours does not show the user's personal mobile number (e.g., so an employee can call a customer without having the customer know the employee's personal mobile telephone number).

In some embodiments, the system is heuristic and (for example) the predefined patterns and/or corresponding mobile device behaviors adapt or otherwise change over time. In some embodiments, expert users can define patterns and/or associated mobile device behaviors. In one example, someone may create a "Mass Transit Work Commute" predefined round-trip pattern. This may differ from the Work Commute example above, in that the commute is via mass transmit (e.g., a company shuttle bus or a municipal mass transit system) as opposed to driving. Such mass transmit environments correspond to different mobile device behaviors compared to a mobile device behavior associated with driving (e.g., because it may be annoying to other people if a mobile telephone begins ringing, or because there is Wi-Fi available). In another example, a school may have a policy that mobile devices are to be turned off while on campus and during school hours. To assist in compliance, the school may create and make available (e.g., via a server such as server 200 in FIG. 2) a predefined stationary pattern (and corresponding mobile device behavior) which includes a location (not shown in Tables 3 and 4) associated with the school, such as the GPS coordinates of the school or the street address of the school. The name of the predefined stationary pattern and/or mobile device behavior may include the name of the school to assist students and/or their parents in identifying the proper pattern to accept and apply. In some embodiments, predefined patterns and/or mobile device behaviors are searchable, for example by location (e.g., searchable by street address, city and state, zip code, etc.) or name (e.g., searching for the name of the school).

A variety of interfaces may be used to present information to a user, receive changes by a user to a mobile device behavior prior to being accepted, and receive permission to implement a mobile device behavior (with any user-specified changes). The following figures show some exemplary user interfaces but are not intended to be limiting.

Figure 5:
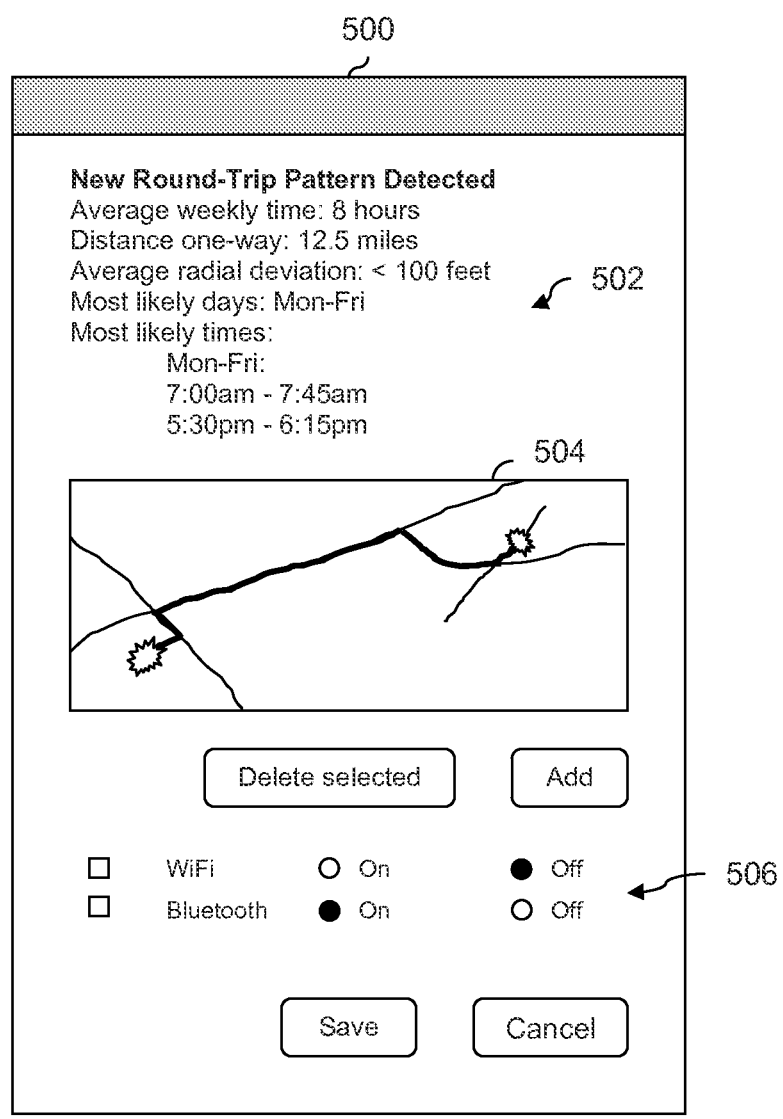
FIG. 5 is a diagram showing an embodiment of a user interface associated with displaying a round-trip pattern and a mobile device behavior for that round-trip pattern.

FIG. 5 is a diagram showing an embodiment of a user interface associated with displaying a round-trip pattern and a mobile device behavior for that round-trip pattern. In the example shown, information associated with the round-trip pattern is displayed at 502, including average weekly time (i.e., spent on this round-trip pattern), one-way distance, average radial deviation, mostly likely days and most likely times. Map 504 shows the route of the round-trip pattern on a map where the ends of the route are displayed as hotspots with the size of the hotspots corresponding to the amount of time spent at those locations. In various embodiments, map 504 includes various pieces of location information (e.g., names of cities, neighborhoods, highways, and street names) and landmarks (e.g., names of parks, schools, buildings, and companies).

In this example, mobile device behavior 506 includes settings for Wi-Fi (suggested setting: off) and Bluetooth (suggested setting: on). Via interface 500, a user has the option of modifying the suggested settings for the mobile device behavior. For example, if the user wants the Bluetooth (or other near-field) setting to not be modified while the mobile device behavior applies (i.e., it will be in whatever state it was in prior to the mobile device behavior going into effect), the user in 506 would select the Bluetooth control and delete it. Setting the Wi-Fi or Bluetooth to be on/off will force the associated communications module to be on (or off) when the mobile device behavior is in effect (i.e., regardless of what state it was in before the mobile device behavior went into effect). The mobile device behavior (with any user-specified changes) is able to be saved (thus indicating the user's acceptance of the mobile device behavior, plus any user-specified changes) using the "Save" button or the window can be closed without saving anything using the "Cancel" button.

In some embodiments, a user is able to modify a mobile device behavior by adding a control which is not displayed. For example, by pressing the "Add" button, user interface 500 may be configured to present a pull down menu or a hierarchical list via which the user selects which control she wants to include in the mobile device behavior.

In some embodiments, a user is able to modify (e.g., prior to accepting a mobile device behavior) information associated with the pattern. For example, via interface 500, a user may be able to adjust the most likely days and/or most likely times for the detected pattern. This, in effect, permits the user (if desired) to change the days and/or times at which a mobile device behavior is in effect. For example, the user may occasionally leave the office a few minutes late and may not want her mobile telephone to lose its Wi-Fi connection while still in the office. To prevent this, the user may change the time range 5:30 pm-6:15 pm to 5:45 pm-6:15 pm, permitting sufficient margin in case the user leaves the office slightly later than usual.

Figure 6:
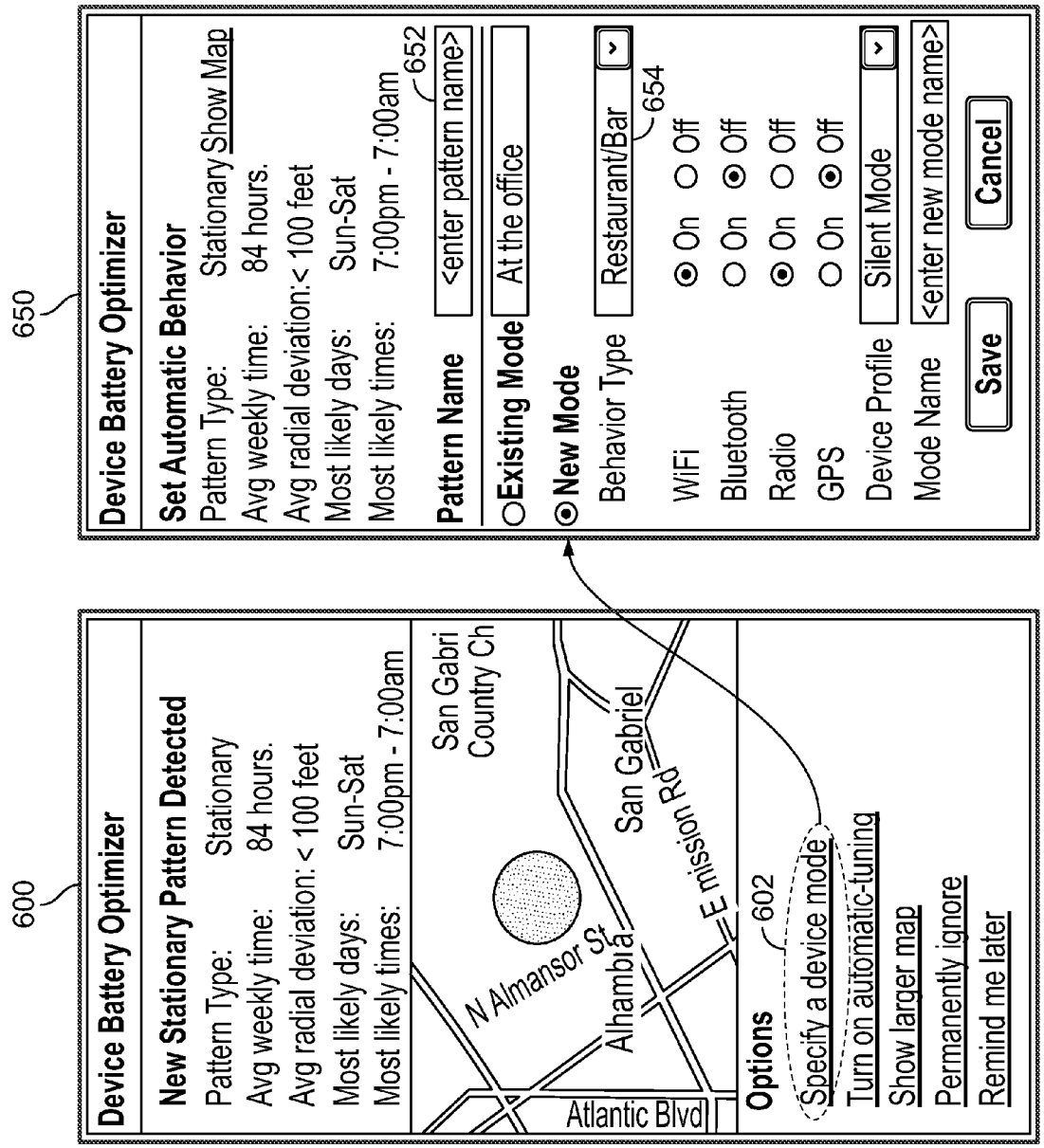
FIG. 6 is a diagram showing an embodiment of a user interface associated with displaying a stationary pattern and a mobile device behavior for that stationary pattern.

FIG. 6 is a diagram showing an embodiment of a user interface associated with displaying a stationary pattern and a mobile device behavior for that stationary pattern. In the example shown, the user interface includes multiple screens where pressing the link "Specify a device mode" (602) in user interface 600 causes user interface 650 to be presented. As in the previous example, user interface 500 information associated with the pattern is displayed (pattern type, average weekly time, average, radial deviation, most likely days, and most likely times) and the stationary pattern is a hotspot on a map. Options in user interface 600 include (in addition to specifying a device mode): turning on automatic tuning (e.g., accepting all mobile device behaviors, including this one and any others), showing a larger map, permanently ignoring, and reminding the user later.

In user interface 650, the information associated with the stationary pattern is shown and the user is presented with a number of options associated with the mobile device behavior. If desired, the user can specify a pattern name for the stationary pattern at 652, for example to be presented to the user in future using a name that jogs the user's memory (e.g., Coffee Bean & Tea Leaf, gym, work, home, etc.).

User interface 650 further includes both an existing mode (e.g., at the office) and a new mode (e.g., restaurant/bar). For the new mode, suggested settings associated with Wi-Fi, Bluetooth, radio, GPS, and a device profile are displayed. If desired, a user can change the settings for an associated control, for example by changing the setting for Wi-Fi from on to off. Alternatively, via pull down menu 654, a user can select other predefined mobile device behaviors, such as at home, at school, at a café, at a routine visit, or shopping. In some embodiments, pull down menu 654 excludes the mode in the existing mode display (in this example, at the office). Other options the user has is to enable the existing mode (e.g., as opposed to enabling a new mode) and giving the mode a name (e.g., laptop settings at restaurants).

In some applications, using a pull down menu, such as pull down menu 654, is a desirable way to present a predefined mobile device behavior to a user. One advantage is that a pull down menu easily permits the user to see what other mobile device behaviors there are. A pull down menu also lists the name of the suggested predefined mobile device behavior, in this example "Restaurant/Bar," which permits the user to easily understand what type of pattern the system believes it has detected and, correspondingly, what the system believes is a preferred or desirable set of behaviors for the mobile device at that pattern. Selecting another predefined mobile device behavior via pull down menu 654 also causes the corresponding controls and their settings to be updated, which permits a user to quickly find the most appropriate one for a particular pattern, make any user specific changes, and apply the mobile device behavior (e.g., with any modifications).

In various embodiments, the user interfaces shown above are presented via a variety of devices, applications, and/or interfaces. In some embodiments, a user interface associated with a mobile device behavior and/or routine is presented via the mobile device itself which would be affected by the mobile device behavior. For example, calling up an application or agent running on a mobile device may cause the interfaces shown in FIG. 5 and/or FIG. 6 to be presented. In some embodiments, a user interface is presented via an Internet browser application, for example running on some device other than the mobile device for which a mobile device behavior applies to (e.g., an Internet browser application running on a desktop computer).

Returning back to the map shown in FIG. 3, in some cases multiple routines are detected and therefore multiple mobile device behaviors are determined. In some embodiments, to manage all of these mobile device behaviors, the mobile device behaviors are prioritized in their presentation to a user. For example, a user may have limited time and/or interest in optimizing their mobile device, and so there may only be a limited number of times that a process is able to present routines and/or operational instructions and/or receive consent for applying them. The following figure shows one embodiment of various factors taken into consideration when prioritizing which routines and/or associated mobile device behaviors to present to a user first.

FIG. 7 is a diagram showing an embodiment of a table for prioritizing mobile device behaviors. In some embodiments, a total score for each mobile device behavior is determined using the table, and the total score determines the order in which mobile device behaviors (and, in some embodiments, information for associated routines) are presented to a user. For clarity, only two mobile device behaviors are shown.

In the example shown, a score is assigned to each mobile device behavior based on an amount of time spent at a pattern (702), a community acceptance rate (704), expert opinion (706), and power savings (708); the scores are then added and used to prioritize the mobile device behaviors (e.g., the mobile device behavior with the highest total score is presented first, and so on). In this example, the mobile device behavior for the school pattern is given a score of 4 out of 5 for criteria 702 and the home pattern is given a score of 5 out of 5 for the same criteria. In some embodiments, a score varies with context, for example by taking into consideration whether a pattern is stationary or round-trip. For example, 10 hours may be a relatively large amount of time spent at a round-trip pattern but may be relatively low for a stationary pattern. Community acceptance rate, shown in column 704, reflects a rate at which other users have accepted the mobile device behavior when presented with that mobile device behavior. In this example, the mobile device behavior associated with the school stationary pattern has a higher rate of acceptance compared to the mobile device behavior for the home stationary pattern and correspondingly has a higher score. The expert opinion criteria (706) reflects the opinion of an expert about which mobile device behaviors are most important; in various embodiments an expert is an expert user in a community of users (e.g., a "power user") or an employee of a company associated with providing and/or implementing mobile device behaviors. The last criteria in the example, power savings 708, reflects the amount of power savings offered by a particular mobile device behavior. In this example, the mobile device behavior for the school stationary pattern is to completely shut down a mobile device during school hours and therefore the power savings offered is quite large and the score is a 5 out of 5. The mobile device behavior for the home stationary pattern offers less power savings (e.g., perhaps because it is completely shut down for a shorter length of time) and therefore has a score of 3 out of 5. Power savings may vary depending upon the length of the mobile device behavior, the number of components which are on/off, etc.

The criteria shown in this example are not intended to be limiting; some other criteria include: a day or time associated with pattern (so a mobile device behavior associated with a pattern occurring during a certain day or certain window of time is more important than other days or windows of time, such as a national holiday, a recurring event such as a birthday, a certain day of the week or month, etc.), or a certain type of weather associated with the pattern (so a mobile device behavior associated with a pattern occurring during type of weather is more important than other types of weather, such as a snowstorm, freezing temperatures, high winds, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   using a processor to determine one or more patterns associated with a mobile device, based at least in part on a set of time information and location information associated with the mobile device, wherein determining the patterns includes:
   detecting one or more round-trip patterns based at least in part on successive locations and times that indicate movement, wherein successive locations and times are determined to indicate movement based at least in part on a determination that successive locations are greater than a threshold distance apart;
   adding each detected round-trip pattern to a list of detected round-trip patterns;
   generating a reduced set of time information and location information at least in part by iteratively removing from the set of time information and location information, for each detected round-trip pattern, successive locations and times comprising the round-trip pattern, wherein the reduced set of time information and location information does not include said successive locations and times comprising said one or more round-trip patterns and does include time information and location information that is not associated with the one or more round-trip patterns;
   analyzing the reduced set of time information and location information to detect one or more stationary patterns; and
   cleaning up the list of round-trip patterns at least in part by ensuring that each round-trip pattern is associated with at least one endpoint corresponding to a detected stationary pattern;
   using the processor to determine, for at least one detected pattern, a mobile device behavior to be associated with the detected pattern at least in part by:
   comparing the detected pattern to a set of predefined patterns;
   determining a predefined pattern in the set that matches the detected pattern; and
   selecting the mobile device behavior corresponding to the predefined pattern;
   and
   configuring the mobile device to exhibit the mobile device behavior automatically during at least a portion of a subsequent repetition of the detected pattern.

2. The method of claim 1, wherein the processor is located on the mobile device.

3. The method of claim 1, wherein:
   the processor is located on a device other than the mobile device; and
   the method further includes receiving, at the processor, the set of time information and location information from the mobile device.

4. The method of claim 1 further comprising presenting information associated with the mobile device behavior via a device other than the mobile device.

5. The method of claim 1 further comprising presenting information associated with the mobile device behavior via one or more of the following: the mobile device and an Internet browser application.

6. The method of claim 1, wherein the round-trip patterns include a first end, a second end, and a path between the first end and the second end.

7. The method of claim 1, wherein the mobile device behavior is associated with configuring one or more of the following: Wi-Fi (or other wireless local area network (LAN) communication protocol), Bluetooth (or other near-field communication protocol), global positioning system (GPS), a data network associated with mobile telephony, a tone, a sound effect, a screen lock, a keypad lock, a background, a wallpaper, separate program execution, separate program termination, call handling, notifications, reminders, or deleting memory.

8. The method of claim 1, wherein the mobile device behavior is associated with one or more of the following: a safe driving profile, a homework profile, a bedtime profile, or a quiet zone profile.

9. The method of claim 1 further comprising modifying the mobile device behavior, wherein the mobile device is configured to exhibit the modification to the mobile device behavior.

10. The method of claim 1, wherein there is a plurality of mobile device behaviors and the method further includes prioritizing the plurality of mobile device behaviors.

11. The method of claim 10, wherein prioritizing is based at least in part on one or more of the following: time spent at a pattern, a time of day, a day of the week, an acceptance rate, expert opinion, or power savings.

12. A system, comprising:
a processor; and
a memory coupled with the processor, wherein the memory is configured to provide the processor with instructions which when executed cause the processor to:
determine one or more patterns associated with a mobile device, based at least in part on a set of time information and location information associated with the mobile device, wherein the instructions to determine the patterns include instructions to:
detect one or more round-trip patterns based at least in part on successive locations and times that indicate movement, wherein successive locations and times are determined to indicate movement based at least in part on a determination that successive locations are greater than a threshold distance apart;
add each detected round-trip pattern to a list of detected round-trip patterns;
generate a reduced set of time information and location information at least in part by iteratively removing from the set of time information and location information, for each detected round-trip pattern, successive locations and times comprising the round-trip pattern, wherein the reduced set of time information and location information does not include said successive locations and times comprising said one or more round-trip patterns and does include time information and location information that is not associated with the one or more round-trip patterns;
analyze the reduced set of time information and location information to detect one or more stationary patterns; and
clean up the list of round-trip patterns at least in part by ensuring that each round-trip pattern is associated with at least one endpoint corresponding to a detected stationary pattern;
determine, for at least one detected pattern, a mobile device behavior to be associated with the detected pattern, wherein the instructions to determine a mobile device behavior include instructions to:
compare the detected pattern to a set of predefined patterns;
determine a predefined pattern in the set that matches the detected pattern; and
select the mobile device behavior corresponding to the predefined pattern; and
configure the mobile device to exhibit the mobile device behavior automatically during at least a portion of a subsequent repetition of the detected pattern.

13. The system of claim 12 further comprising instructions for presenting information associated with the mobile device behavior via a device other than the mobile device.

14. The system of claim 12 further comprising instructions for presenting information associated with the mobile device behavior via one or more of the following: the mobile device and an Internet browser application.

15. The system of claim 12, wherein the mobile device behavior is associated with configuring one or more of the following: Wi-Fi (or other wireless local area network (LAN) communication protocol), Bluetooth (or other near-field communication protocol), global positioning system (GPS), a data network associated with mobile telephony, a tone, a sound effect, a screen lock, a keypad lock, a background, a wallpaper, separate program execution, separate program termination, call handling, notifications, reminders, or deleting memory.

16. The system of claim 12, wherein the mobile device behavior is associated with one or more of the following: a safe driving profile, a homework profile, a bedtime profile, or a quiet zone profile.

17. A computer program product, the computer program product being embodied in a tangible non-transitory computer readable storage medium and comprising computer instructions for:
determining one or more patterns associated with a mobile device, based at least in part on a set of time information and location information associated with the mobile device, wherein determining the pattern includes:
detecting one or more round-trip patterns based at least in part on successive locations and times that indicate movement, wherein successive locations and times are determined to indicate movement based at least in part on a determination that successive locations are greater than a threshold distance apart;
adding each detected round-trip pattern to a list of detected round-trip patterns;
generating a reduced set of time information and location information at least in part by iteratively removing from the set of time information and location information, for each detected round-trip pattern, successive locations and times comprising the round-trip pattern, wherein the reduced set of time information and location information does not include said successive locations and times comprising said one or more round-trip patterns and does include time information and location information that is not associated with the one or more round-trip patterns;
analyzing the reduced set of time information and location information to detect one or more stationary patterns; and
cleaning up the list of round-trip patterns at least in part by ensuring that each round-trip pattern is associated with at least one endpoint corresponding to a detected stationary pattern;
determining, for at least one detected pattern, a mobile device behavior to be associated with the detected pattern at least in part by:
comparing the detected pattern to a set of predefined patterns;
determining a predefined pattern in the set that matches the detected pattern; and
selecting the mobile device behavior corresponding to the predefined pattern; and
configuring the mobile device to exhibit the mobile device behavior automatically during at least a portion of a subsequent repetition of the detected pattern.

18. The method of claim 1, wherein configuring the mobile device includes configuring the device to perform the steps of:

detecting, by an agent on the mobile device, an event indicating the subsequent repetition of the detected pattern; and automatically configuring the device to exhibit the mobile device behavior based at least in part on the detected event.

19. The system of claim 12, wherein the instructions for configuring the mobile device include instructions which when executed cause the processor to:

detect, by an agent on the mobile device, an event indicating the subsequent repetition of the detected pattern; and automatically configure the device to exhibit the mobile device behavior based at least in part on the detected event.

20. The method of claim 1, wherein determining the predefined pattern includes computing for a round-trip pattern, based at least in part on location and time data associated with the round-trip pattern, a velocity of travel; and determining that the computed velocity of travel is associated with a driving commute pattern.

21. The system of claim 12, wherein determining the predefined pattern includes computing for a round-trip pattern, based at least in part on location and time data associated with the round-trip pattern, a velocity of travel; and determining that the computed velocity of travel is associated with a driving commute pattern.

* * * * *